US008204384B2

(12) United States Patent  
Amadeo et al.

(10) Patent No.: US 8,204,384 B2
(45) Date of Patent: Jun. 19, 2012

(54) PHASE-MODULATING COMMUNICATION DEVICE

(75) Inventors: Paul Amadeo, San Diego, CA (US); Allen Ripingill, Turner Falls, MA (US); David Robinson, San Diego, CA (US); Irene Chen, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 425 days.

(21) Appl. No.: 12/623,356

(22) Filed: Nov. 20, 2009

(65) Prior Publication Data

US 2010/0135670 A1 Jun. 3, 2010

Related U.S. Application Data

(60) Provisional application No. 61/117,078, filed on Nov. 21, 2008.

(51) Int. Cl.
*H04B 10/00* (2006.01)

(52) U.S. Cl. .................. 398/170; 398/169; 398/118

(58) Field of Classification Search .......... 398/168–170
See application file for complete search history.

(56) References Cited

U.S. PATENT DOCUMENTS

| | | | | |
|---|---|---|---|---|
| 3,633,158 A | * | 1/1972 | Heibel | 398/170 |
| 3,863,064 A | * | 1/1975 | Doyle et al. | 398/170 |
| 3,989,942 A | * | 11/1976 | Waddoups | 398/170 |
| 4,131,791 A | * | 12/1978 | Lego, Jr. | 398/171 |
| 4,132,940 A | | 1/1979 | Schindler | |
| 4,134,008 A | * | 1/1979 | de Corlieu et al. | 398/170 |
| 4,143,263 A | * | 3/1979 | Eichweber | 398/170 |
| 4,227,261 A | * | 10/1980 | Robertsson | 398/169 |
| 4,361,911 A | * | 11/1982 | Buser et al. | 398/171 |
| 4,662,003 A | * | 4/1987 | Eichweber | 398/170 |
| 4,731,879 A | * | 3/1988 | Sepp et al. | 398/170 |
| 4,806,932 A | * | 2/1989 | Bechtel | 342/33 |
| 4,879,763 A | * | 11/1989 | Wood | 398/168 |
| 4,887,310 A | * | 12/1989 | Meyzonnette et al. | 398/170 |
| 4,916,296 A | * | 4/1990 | Streck | 235/454 |
| 4,983,021 A | * | 1/1991 | Fergason | 349/1 |
| 5,010,586 A | * | 4/1991 | Mortimore et al. | 398/170 |
| 5,015,096 A | * | 5/1991 | Kowalski et al. | 356/613 |
| 5,091,636 A | * | 2/1992 | Takada et al. | 235/454 |
| 5,121,242 A | * | 6/1992 | Kennedy | 398/170 |
| 5,185,675 A | * | 2/1993 | Banks | 398/170 |
| 5,191,614 A | * | 3/1993 | LeCong | 380/256 |
| 5,253,099 A | * | 10/1993 | Heidemann | 359/260 |
| 5,274,379 A | * | 12/1993 | Carbonneau et al. | 342/45 |
| 5,317,442 A | * | 5/1994 | Sharp et al. | 398/170 |
| 5,355,241 A | * | 10/1994 | Kelley | 398/170 |
| 5,361,157 A | * | 11/1994 | Ishikawa et al. | 398/168 |
| 5,375,008 A | * | 12/1994 | Guerreri | 398/170 |
| 5,450,231 A | * | 9/1995 | Battig et al. | 359/290 |

(Continued)

*Primary Examiner* — Agustin Bello
(74) *Attorney, Agent, or Firm* — Kilpatrick Townsend & Stockton LLP

(57) ABSTRACT

A system, method, and communication device are disclosed. The system can include an optical interrogator and a phase-modulating communication device. The communication device can include a retro-optimized lens, a phase modulator, and a processor. The retro-optimized lens can be a non-imaging optical arrangement configured to minimize deviation between an incoming signal and a reflected signal used for return link communications. The processor can be configured to calibrate a modulation path length of the communication device based on a wavelength of the communication signal and can control an operation of the phase-modulator to send phase-coded messages to the interrogator. Optionally, the processor can perform a real-time phase calibration of the communication device using feedback from the interrogator.

34 Claims, 10 Drawing Sheets

U.S. PATENT DOCUMENTS

| | | | | |
|---|---|---|---|---|
| 5,459,470 A * | 10/1995 | Wootton et al. | | 342/45 |
| 5,532,470 A * | 7/1996 | Frank | | 235/491 |
| 5,539,565 A * | 7/1996 | Waddoups et al. | | 398/170 |
| 5,621,829 A * | 4/1997 | Ford | | 385/22 |
| 5,625,726 A * | 4/1997 | Ichigi | | 385/14 |
| 5,638,162 A | 6/1997 | Nettleton et al. | | |
| 5,657,148 A * | 8/1997 | Feuer et al. | | 359/263 |
| 5,796,880 A * | 8/1998 | Ford et al. | | 385/1 |
| 5,819,164 A * | 10/1998 | Sun et al. | | 455/106 |
| 5,841,392 A * | 11/1998 | Kishimoto | | 342/125 |
| 5,975,697 A * | 11/1999 | Podoleanu et al. | | 351/206 |
| 6,154,299 A * | 11/2000 | Gilbreath et al. | | 398/170 |
| 6,493,123 B1 * | 12/2002 | Mansell et al. | | 398/169 |
| 6,529,655 B1 * | 3/2003 | Jurbergs | | 385/19 |
| 6,545,805 B2 * | 4/2003 | He et al. | | 359/239 |
| 6,624,916 B1 * | 9/2003 | Green et al. | | 398/169 |
| 6,985,274 B2 * | 1/2006 | Kubaink | | 359/241 |
| 6,989,901 B2 | 1/2006 | Abbink | | |
| 7,054,563 B2 * | 5/2006 | Tsumura | | 398/169 |
| 7,224,905 B2 * | 5/2007 | Ruggiero | | 398/170 |
| 7,308,202 B2 * | 12/2007 | Roes et al. | | 398/108 |
| 7,308,207 B2 * | 12/2007 | Chen | | 398/170 |
| 7,317,876 B1 * | 1/2008 | Elliott | | 398/170 |
| 7,360,703 B2 * | 4/2008 | McIntyre et al. | | 235/454 |
| 7,388,669 B2 | 6/2008 | Abbink | | |
| 7,414,568 B2 * | 8/2008 | Fortin et al. | | 342/45 |
| 7,474,855 B2 * | 1/2009 | Nishimura et al. | | 398/118 |
| 7,603,041 B2 * | 10/2009 | Varshneya et al. | | 398/170 |
| 7,715,727 B2 * | 5/2010 | Murphy et al. | | 398/170 |
| 7,720,388 B2 * | 5/2010 | Varshneya et al. | | 398/137 |
| 7,796,896 B2 * | 9/2010 | Sikora et al. | | 398/170 |
| 7,831,150 B2 * | 11/2010 | Roes et al. | | 398/130 |
| 7,859,675 B2 * | 12/2010 | Maryfield et al. | | 356/445 |
| 7,860,401 B2 * | 12/2010 | Saint Clair | | 398/170 |
| 7,889,997 B2 * | 2/2011 | Won | | 398/169 |
| 7,982,960 B2 * | 7/2011 | Hsieh | | 359/634 |
| 7,983,565 B2 * | 7/2011 | Varshneya et al. | | 398/118 |
| 8,027,591 B2 * | 9/2011 | Maryfield | | 398/170 |
| 8,050,569 B2 * | 11/2011 | Habberstad et al. | | 398/118 |
| 2001/0013967 A1 * | 8/2001 | Tsumura | | 359/170 |
| 2004/0075880 A1 * | 4/2004 | Pepper et al. | | 359/212 |
| 2005/0002039 A1 | 1/2005 | Abbink | | |
| 2005/0270539 A1 | 12/2005 | Abbink | | |
| 2006/0256344 A1 * | 11/2006 | Sikora et al. | | 356/477 |
| 2007/0065150 A1 * | 3/2007 | Sikora et al. | | 398/118 |
| 2007/0177880 A1 * | 8/2007 | Karasikov et al. | | 398/170 |
| 2008/0247764 A1 * | 10/2008 | Lewin et al. | | 398/154 |
| 2008/0260380 A1 * | 10/2008 | Ridley et al. | | 398/41 |
| 2010/0135670 A1 * | 6/2010 | Amadeo et al. | | 398/158 |

* cited by examiner

PHASE-MODULATING COMMUNICATION DEVICE

CROSS-REFERENCE TO RELATED APPLICATION

This application claims the benefit of and is a non-provisional of U.S. Provisional Patent Application 61/117,078 filed on Nov. 21, 2008, which is incorporated herein by reference for all purposes.

BACKGROUND

Free-space communications can be susceptible to a variety of atmospheric disturbances. These disturbances can include atmospheric scintillation and other anomalies encountered in real-world operating scenarios such as on the battlefield. The effect of atmospheric disturbances can be particularly problematic for communication systems that rely upon amplitude modulation of return link communications.

SUMMARY

A system, method, and communication device are disclosed. The system can include an optical interrogator and a phase-modulating communication device. The communication device can include a retro-optimized lens, a phase modulator, and a processor. The retro-optimized lens can be a non-imaging optical arrangement configured to minimize deviation between an incoming signal and a reflected signal used for return link communications. The processor can be configured to calibrate a modulation path length of the communication device based on a wavelength of the communication signal and can control an operation of the phase-modulator to send phase-coded messages to the interrogator. Optionally, the processor can perform a real-time phase calibration of the communication device using feedback from the interrogator.

In one embodiment, a phase-modulating communication device is disclosed. The communication device includes a housing, a lens arrangement, a beam splitter, a phase modulator, a photodetector, and a processor. The lens arrangement is configured to pass a communication signal into the housing. The beam splitter is optically coupled to the lens arrangement and directs a first part of the communication signal along a reference path and a second part of the communication signal along a modulation path. The phase modulator varies a length of the modulation path relative to a length of the reference path in response to a control signal. The photodetector detects an information element of the communication signal and outputs a receive data signal. The processor generates the control signal based on the receive data signal.

In another embodiment, a method of phase-modulated communication using a device that has a reference path and a modulation path is disclosed. The method includes retrieving calibration data from a memory of the device, applying a bias signal to one or more actuators of the device according to the calibration data, and adjusting a length of the modulation path. The method also includes receiving a communication signal at the device and directing a first part of the communication signal along the reference path and a second part of the communication signal along the modulation path. The method includes varying the length of the modulation path with the one or more actuators to create a phase difference between the second part of the communication signal and the first part of the communication signal. The method includes reflecting the first part of the communication signal and the second part of the communication signal back along their respective reference path and modulation path away from the device.

In another embodiment, a communication device is disclosed. The communication device includes a housing, an optical arrangement, and a phase modulator. The optical arrangement comprises a retro-optimized lens and at least one reflector optically coupled to the retro-optimized lens. The retro-optimized lens is configured to minimize a deviation of a reflected signal from an incident path of an incoming communication signal when the incoming communication signal is reflected away from the communication device by the at least one reflector. The phase modulator is coupled to the optical arrangement and configured to selectively vary a phase of the reflected signal.

In still another embodiment, a phase-modulating retro-reflector is disclosed. The retro-reflector includes a housing with first and second apertures. A first lens is optically coupled to the first aperture and receives a first portion of an incoming communication signal. A first reflector is optically coupled to the first lens and reflects the first portion of the incoming communication signal along a reference path and toward a source of the communication signal. A second lens is optically coupled to the second aperture for receiving a second portion of the incoming communication signal. A second reflector is optically coupled to the second lens and reflects the second portion of the incoming communication signal along a modulation path toward the source of the communication signal. An actuator changes the position of the second reflector so as to vary a length of the modulation path. A processor controls the length of the modulation path in response to information obtained from the second portion of the incoming communication signal.

Additional aspects of the invention will become apparent from the following description and with reference to the accompanying drawings.

In the figures, similar components and/or features may have the same reference label. Also, various components of the same type may be distinguished by following the reference label with a second label. If only the first reference label is used, the description is applicable to any of the similar components designated by the first reference label.

DETAILED DESCRIPTION

Figure 1:
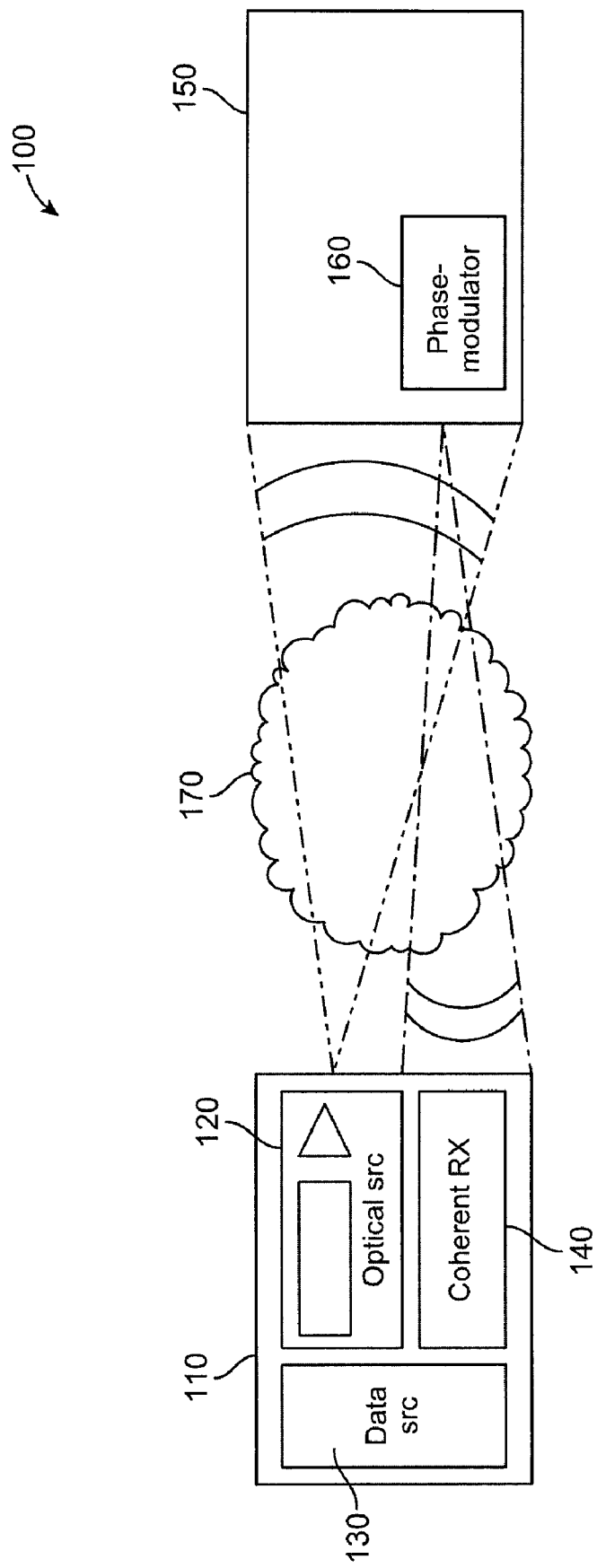
FIG. 1 shows an exemplary communication system.

FIG. 1 shows an exemplary free-space communication system 100 according to various embodiments of the present invention. As shown, communication system 100 includes an interrogator 110 and a target 150. Interrogator 110 communicates with target 150 by passing an optical signal through atmosphere 170. Target 150 can respond to the interrogator by retro-modulating the optical signal. As used herein, "optical" refers to signals used with communication system 100 regardless of whether they are visible to the human eye. In particular, optical signals can have wavelengths in the visible spectrum or the infrared spectrum. As one example, interrogator 110 and target 150 may communicate using an infrared signal having a wavelength in the range of 900-1550 nm.

Atmosphere 170 can be the source of disturbances that affect communication between the devices. For example, fluctuations in air density can produce anomalous refraction ("scintillation") of the communication signal. Density fluctuations can be caused by wind or temperature gradients and can directly affect the illuminance of the communication signal. Scintillation effects can be particularly disruptive of retro-reflected communications that use a variation in signal amplitude to convey information elements.

Interrogator 110 can serve as a hub for communicating with a plurality of targets 150 or it can be used for one-to-one communication with a designated target device. In some embodiments, communication system 100 is a combat identification system in which interrogator 110 sends coded optical messages to target 150. Target 150 can be a portable device that is carried by a soldier, attached to a vehicle, or otherwise adapted for field use. The coded messages can serve to identify the interrogator 110 to the target 150 in a secure manner. In such applications, the reliability of retro-reflected communications from target 150 to interrogator 110 in different atmospheric conditions is extremely important. Although a combat identification system is used as an example, it will be recognized that communication system 100 is not limited to any particular application.

As shown, interrogator 110 includes an optical source 120 and data source 130. The optical source 120 can produce a highly collimated beam such as a laser and may include a drive circuit and an optical amplifier. Data source 130 can be coupled to optical source 120 for controlling its power level and modulation. The output of the optical source 120 acts as a carrier for communication between the devices. For example, interrogator 110 can modulate the optical signal with an outbound message that is determined by data source 130. Target 150 can detect the outbound message and can respond by phase-modulating and retro-reflecting the optical communication signal. In this way, the optical output of interrogator 110 provides a two-way communication link for sending and receiving messages.

Because the position of the devices in communication system 100 can change with time, the distance traversed by the optical communication signal and its angle of incidence can also change. This can increase the likelihood of scintillation effects and other atmospheric disturbances. However, it has been discovered that scintillation effects and like disturbances have only a limited effect on the phase of an optical communication signal. As a result, phase-modulation of the optical communication system is advantageously used for return-link communications in system 100.

Target 150 may include a phase modulator 160. Phase modulator 160 can retro-modulate the optical communication signal and create a phase change which carries information back to interrogator 110. In some embodiments, phase modulator 160 is optically coupled to a non-imaging lens arrangement. The non-imaging lens arrangement can be optimized for retro-reflection by minimizing variation of the return path of the reflected signal from the path of the incoming communication signal. As described herein, the retro-optimized non-imaging lens arrangement can also support an expanded field of view. For example, in some embodiments, the retro-optimized lens arrangement can support a field of view of approximately ±60 degrees relative to its optical axis.

In various embodiments, target 150 responds to the interrogator or withholds its response based on information conveyed by the optical communication signal. For example, with a combat identification system, data source 130 can generate an encrypted transmit code or other identifier for initiating communication with target 150. Target 150 can demodulate the optical communication signal and verify the identity of interrogator 110. If the identity of interrogator 110 cannot be verified, target 150 can remain silent and refrain from responding to the optical signal, indicate that an invalid signal was detected, or take some other action.

The incoming communication signal may be also encoded with an address or other means for identifying which target the communication is intended to reach. In that case, target 150 can compare the identifier to its own identifier and determine whether to respond by phase-modulating the optical communication signal. Other applications of bidirectional communication between interrogator 110 and target 150 are specifically contemplated within the scope of the present invention.

In operation, target 150 can separate the incoming communication signal into two parts. One part can serve as an unmodulated reference signal. The other part can be phase-modulated with a response message. In some embodiments, phase modulator 160 includes a beam splitter which directs a first portion of the incoming optical signal along a reference path and a second portion of the incoming signal along a modulation path. The path length of the modulation path and the modulation distance (stroke length) can be varied to create a phase difference between the reference and modulation signals.

In alternative embodiments, target 150 can include a housing with separate reference and modulation apertures. The reference aperture can receive and return the reference part of the optical communication signal. A phase modulator can be optically coupled to the modulation aperture for returning the modulated part of the optical signal. The reference and modulation signals can be reflected away from target 150 and back to interrogator 110 along the incident path of the incoming communication signal.

Interrogator 110 can include a coherent receiver 140 for processing the phase-modulated return link signal from target 150. Coherent receiver 140 can detect the returned reference and modulated signals and can isolate them through signal processing operations. Because both the reference and modulated signals traverse the same path through atmosphere 170, each is subjected to the same jitter and other disturbances. Coherent receiver 140 can mix the two signals to generate a differential signal from which the phase-coded information can be recovered. Jitter and other disturbances common to both signals are thereby removed.

In some embodiments, a static and dynamic calibration is performed to improve communications efficiency. Static calibration can account for variations in the length of the modulation path relative to the reference path. Path length differences can arise during the manufacturing process, from a spacing between separate reference and modulation apertures, and/or due to environmental factors such as ambient temperature. As part of its initialization, target 150 can correct for path length differences by adjusting the length of the modulation path relative to the reference path. For example, as described herein, the modulation path length can be adjusted so that any difference between path lengths (modulo communication wavelength $\lambda$) can be achieved.

Target 150 and interrogator 110 can also perform a dynamic, real-time calibration process. In some embodiments, interrogator 110 sends a calibration message to target 150. The calibration message can include a training sequence for phase-modulation by the target. For example, interrogator 110 can send a specific bit pattern with an instruction to initiate calibration and target 150 can respond by phase-modulating the communication signal with the training sequence. Based on the output of coherent receiver 140, interrogator 110 can direct target 150 to increase or decrease the length of its modulation path and/or its modulation distance.

Target 150 can make the adjustment and phase-modulate the optical communication signal with the training sequence or bit pattern a second time. This process can be repeated until interrogator 110 successfully demodulates the signal from target 150 and can be resumed as needed during a communication. With static and dynamic calibration, differences in path length, the relative position of the devices, the angle of incidence, and disruptions from other environmental factors can be minimized.

Figure 2:
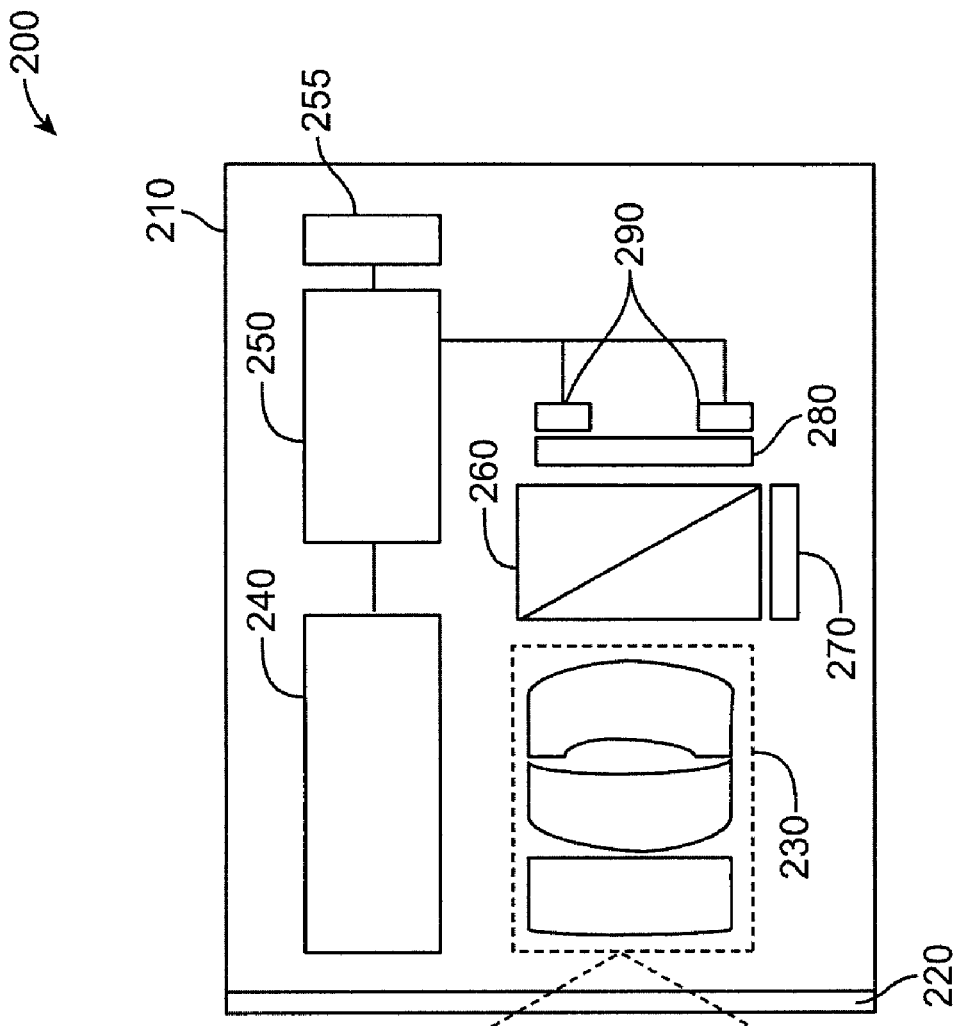
FIG. 2 shows a phase-modulating communication device.

FIG. 2 shows one embodiment of portable communication device 200. Portable communication device 200 can be a target 150 that operates within the communication system 100 of FIG. 1.

As illustrated, communication device 200 includes a housing 210. Communication signals enter housing 210 through an aperture 220 which, in turn, can optionally be fitted with a wavelength selective filter. The wavelength selective filter can pass communication signals of interest into and out of housing 210 without obstruction. For example, with infrared communication signals, a filter can be selected that is effectively transparent to infrared wavelengths while strongly attenuating visible light.

A non-imaging lens arrangement 230 is optically coupled to aperture 220 and receives the incoming communication signal. In some embodiments, the lens arrangement is a wide-angle lens formed from an optical medium having a high index of refraction. The optical medium preferably has an index of refraction greater than or equal to three and may be fashioned from silicon, germanium or other materials. Non-imaging lens arrangement 230 can be configured to minimize deviation of an incoming communication signal and a retro-reflected communication signal while maintaining a wide angle of acceptance. As shown by the dashed lines, for example, non-imaging lens arrangements 230 may support a field of view of ±60 degrees or more in relation to its optical axis.

A detector 240 is also optically coupled to aperture 220 and receives the incoming communication signal. Detector 240 can include one or more photodiodes or like components that are sensitive to optical signals having wavelengths used for communicating in system 100. For example, silicon, germanium, or indium-gallium-arsenide photodiodes can be used to detect infrared communication signals. Detector 240 produces a signal at its output that is representative of characteristics of the incoming communication. For example, a voltage level or current flow at the output can be proportional to the intensity, phase, or polarization of the incoming optical signal.

A processor 250 is electrically coupled to the detector 240 and receives its output signal. Processor 250 can include one or more programmable logic elements such as complex programmable logic devices (CPLD), field-programmable gate arrays (FPGA), application-specific integrated circuits (ASICs), microcontrollers, microprocessors, and the like. As shown, processor 250 is also coupled to a memory 255 and can access data and program instructions stored therein.

Memory 255 can include one or more random-access memory (RAM), read-only memory (ROM), or other volatile or non-volatile computer-readable storage elements.

A phase modulator of communications device 200 can include a beam splitter 260 and reflectors 270, 280. As shown, beam splitter 260 is optically coupled to non-imaging lens arrangement 230 and configured to direct the incoming optical signal to reflectors 270, 280 along separate paths. Beam splitter 260 directs a first part of the incoming optical signal along a reference path to fixed reflector 270 and a second part of the incoming optical signal along a modulation path to moveable reflector 280. Reflectors 270, 280 can be mirrors or other reflective surfaces arranged to return the optical signals back along their respective incident paths. In operation, the reflected optical signals pass back through lens arrangement 230 and out of communication device 200.

Actuators 290 are coupled to moveable reflector 280 and are operative to change its position in response to signals from processor 250. Actuators 290 can be piezo-electric or other electro-mechanical devices capable of varying the position of moveable reflector 280. Varying the position of moveable reflector 280, in turn, creates a corresponding change in the modulation path length. In various embodiments, actuators 290 produce a continuous (analog) variation of the modulation path length, or they may be configured to vary the modulation path length in one or more discrete steps or increments.

Actuators 290 can control both the length of the modulation path and the distance over which moveable reflector 280 is displaced during phase modulation. For example, actuators 290 can move reflector 280 towards or away from the lens arrangement to vary the path length and can also control a stroke-length or displacement of moveable reflector 280.

Figure 3:
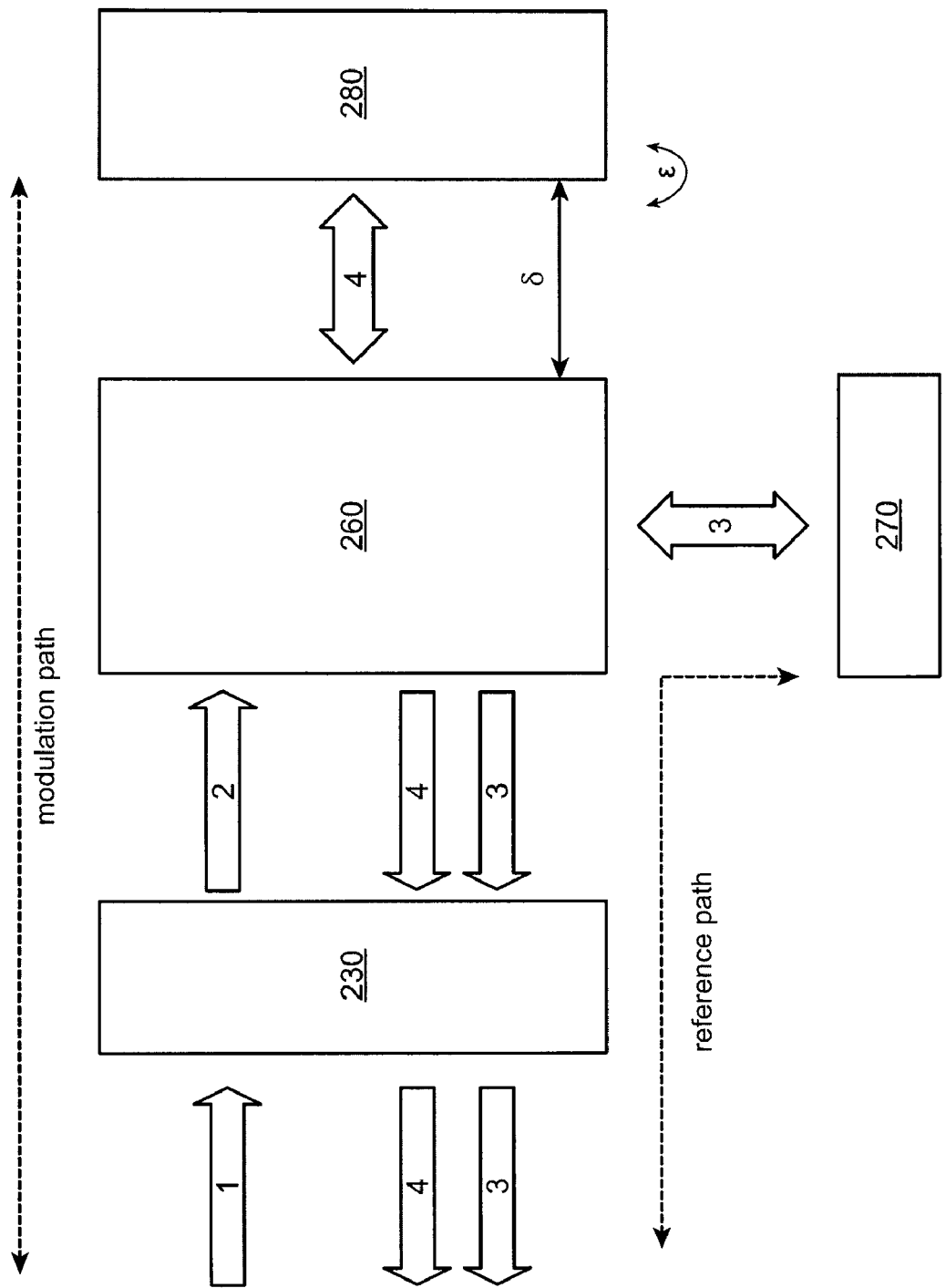
FIG. 3 shows an exemplary optical flow diagram.

The operation of communication device 200 will now be described with reference to the optical diagram of FIG. 3. As shown in FIG. 3, an incoming communication signal (1) passes through non-imaging lens arrangement 230 and enters communication device 200. A refracted beam (2) exits from the non-imaging lens arrangement and is received at beam splitter 260. Beam splitter 260 divides the refracted beam (2) into a first part (3) and a second part (4). The first part (3) ("reference signal") is directed to fixed reflector 270 whereupon it is reflected back to the beam splitter 260. The reflected reference signal (3) passes back through the non-imaging lens arrangement 230 and out of communication device 200. The path followed by reference signal (3) is referred to as the "reference path."

The second part (4) ("modulated signal") is directed by beam splitter 260 to moveable reflector 280. Moveable reflector 280 reflects the modulation signal (4) back to beam splitter 260 which passes it back through non-imaging lens arrangement 230. Non-imaging lens arrangement 230 directs the reflected modulation signal (4) out of communication device 200. The path followed by modulated signal (4) is referred to as the "modulation path."

As shown in the diagram, delta ($\delta$) represents a variable distance between beam splitter 260 and moveable reflector 280. As used herein, the term "base path length" refers to a length of the modulation path when delta has a fixed value. Epsilon ($\epsilon$) represents a variable modulation distance. The modulation distance refers to an amount of displacement of moveable reflector 280 produced by actuators 290 during phase modulation.

Upon activation, processor 250 can retrieve data from memory 255 for calibrating the modulation path length. The calibration data, for example, can specify a path length correction for adjusting the modulation path in relation to the reference path. To ensure the same phase relationship between the signals (3), (4), a difference between the modulation path and the reference path may be initially set to an integral number of multiples of the communication signal wavelength.

Differences in path length can arise during manufacturing and can also result from environmental factors. In some embodiments, memory 255 includes a look-up table or similar data structure for determining the appropriate path length correction. The look-up table can include a base correction amount determined during the manufacturing process along with an environmental correction factor. For example, communication device 200 may include a temperature sensor and the environmental correction factor can be determined according to the ambient temperature and thermal characteristics of the lens arrangement 230, beam splitter 260, and/or reflectors 270, 280.

Processor 250 can adjust the variable modulation path length ($\delta$) based on the path length correction value prior to communication with interrogator 110. In one embodiment, the path length correction corresponds to a bias voltage value. Processor 250 can determine a bias amount based on the calibration data and can apply a corresponding bias voltage to actuators 290. In response to the bias voltage, actuators 290 can adjust a position of the moveable reflector 280 to achieve the base path length that is appropriate for operating conditions.

When the base path length has been calibrated, communication device 200 is ready to send and receive signals. Using the output of detector 240, processor 250 can detect and demodulate the incoming communication signal. As discussed herein, a real-time calibration process can also be performed to optimize both the modulation path length and the modulation distance based on feedback from the interrogator.

In one embodiment, the demodulated data can represent a challenge code or other predetermined message for identifying a sender of the communication. If a response is appropriate, processor 250 controls the operation of actuators 290 to vary a phase of the reflected modulation signal (4) in relation to the reflected reference signal (3). More specifically, processor 250 can cause actuators 290 to vary the position of the moveable reflector 280 over a specified modulation distance giving rise to a phase difference which can be detected, for example, by the coherent receiver 140 of interrogator 110. In this way, phase is used as the information carrier in the optical communication system. Because both the reference signal and the phase-modulated signal traverse the same atmospheric path, each is subject to the same disturbances.

Figure 4:
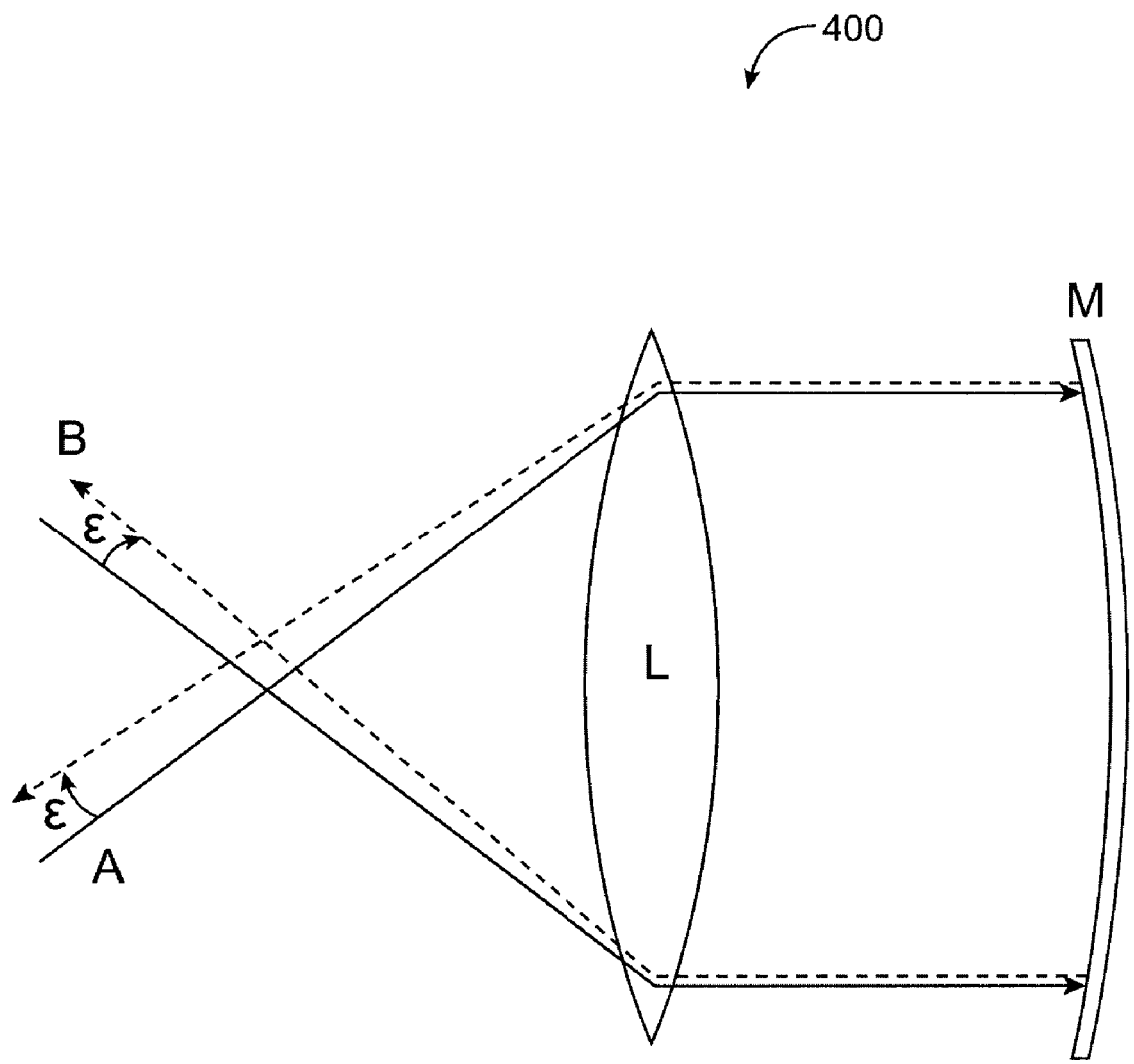
FIG. 4 shows an exemplary retro-optimized lens.

FIG. 4 shows aspects of an exemplary retro-optimized lens arrangement 400. The retro-optimized lens arrangement can be used as the non-imaging lens 230 of communication device 200. Although a single lens is shown for simplicity, it will be understood that retro-optimized lens arrangement 400 can include a plurality of individual lens elements each having potentially different curvatures and optical properties. Preferably, at least one of the lenses in the arrangement is formed from an optical medium having an index of refraction greater than or equal to three ($n \geq 3$).

In the figure, a retro-optimized lens L is shown in relation to a reflective surface M. Reflective surface M, for example, can be moveable reflector 280 of communication device 200. Two arbitrary communication signals from transmitter locations A and B are depicted within the field of view of lens arrangement 400. The incoming communication signals pass through lens L and are retro-reflected by reflective surface M. As an aid to understanding the lens configuration, the incident paths of the incoming signals are shown with solid lines, and the reflected paths are shown with dotted lines.

Unlike a conventional imaging lens, retro-optimized lens L is designed to control deviation between the incoming signals and their retro-reflected counterparts throughout a wide field of view. Put another way, lens L does not focus an image onto reflective surface M, but is instead designed to minimize deviation angles, E, between the reflected signals (which pass back through the lens arrangement) and the incident signals which arrive at the lens from the transmitter locations.

Generally speaking, when an incoming signal passes through a lens and is reflected back through the lens, distortion is introduced between the incident optical path and the reflected optical path. Distortion can result from refraction at the interface between air and the optical medium and from lens imperfections. The amount of this distortion may vary with the angle of incidence in relation to an optical axis of the lens. As a result, return signal power can be lost and communications efficiency can be degraded. Also, since these losses may increase with angle, they can adversely affect the ability of a communication device to operate with a wide field of view. Retro-optimized lens L is designed to mitigate these problems.

Lens L can be created with a merit function which minimizes deviation over its field of view. As shown in the figure, the reflected signals deviate somewhat from the paths of the corresponding incident signals. The structure of retro-optimized lens L is designed to control this deviation by minimizing E. This can be accomplished by analyzing a very large number of points P (P$\rightarrow \infty$) within the field of view and determining mathematically the lens structure L which results in the smallest deviation. For example, in one embodiment, lens L is designed to minimize the average deviation over the field of view that is ±60 degrees about its optical axis.

Figure 5A:
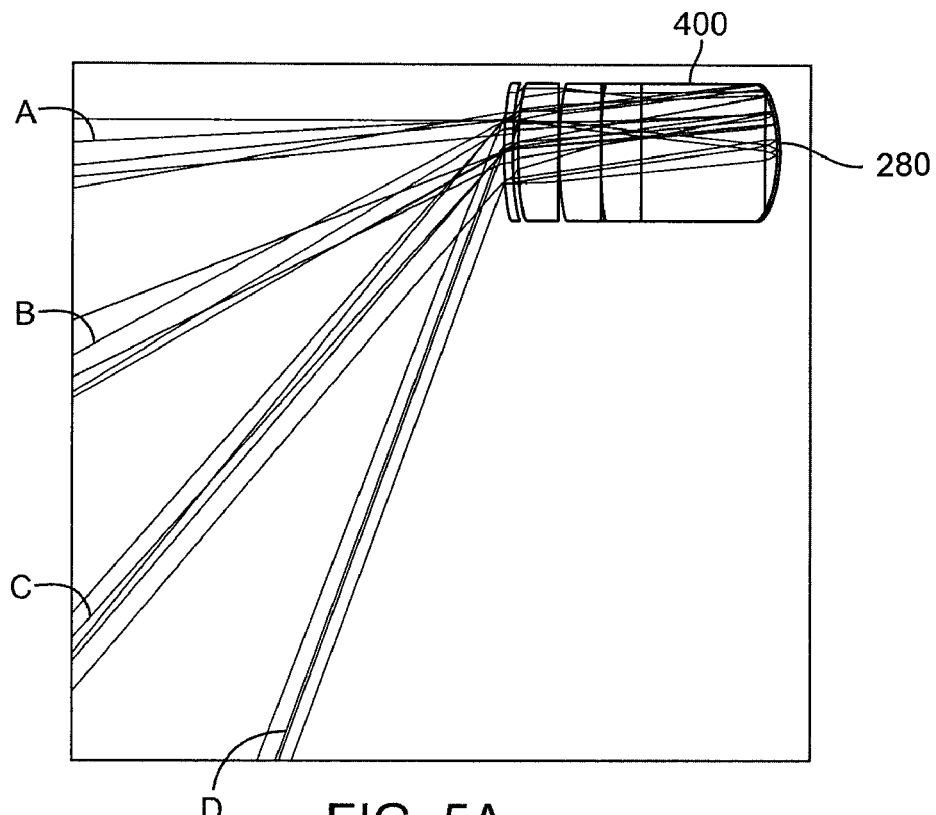
FIGS. 5A-5B show further aspects of the retro-optimized lens of FIG. 4.

FIG. 5A is a diagram showing simulated optical properties of retro-optimized lens arrangement 400. Four ray bundles A-D are shown in the diagram as being incident upon retro-optimized lens 400. The ray bundles pass through lens 400 and are returned along their incident paths by moveable reflector 280. For simplicity, only one-half of the field of view is shown. The partial field of view can be approximately 60 degrees relative to the optical axis.

A deviation of each ray bundle is constrained by the lens design such that the incident and reflected paths of the individual rays do not differ by more than a predetermined amount. The predetermined amount establishes a maximum deviation over the entire field of view so that, for example, it constrains the deviation of ray bundle D to the same extent as the deviation of ray bundle A. In some embodiments, the constraint on deviation can be tied to an operating distance of portable communication device 200. For example, a smaller deviation may be needed for communicating effectively at longer ranges than for communicating at shorter ranges.

Figure 5B:
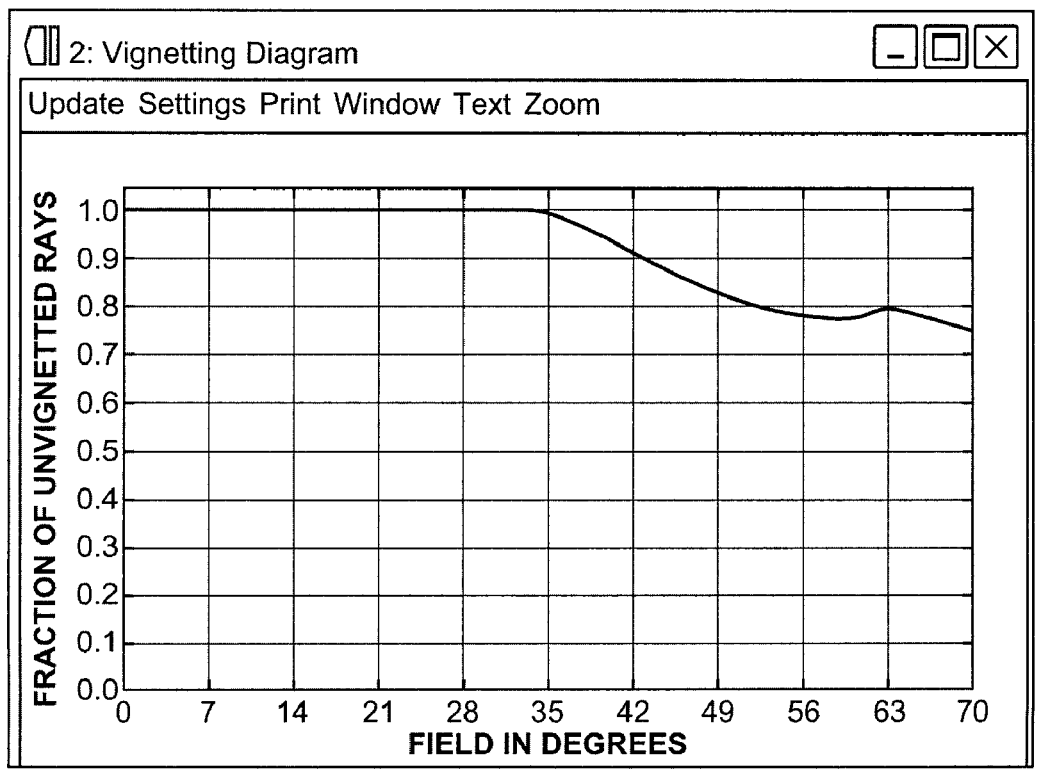

FIG. 5B corresponds to FIG. 5A and shows additional performance aspects of retro-optimized lens arrangement 400. In the diagram, a fraction of vignetted rays is plotted against field angle for retro-optimized lens arrangement 400. Vignetting refers to the reduction of light transmission through an optical system and can be expressed as a power loss. In a free space communication system, for example, the reduction of light transmission and corresponding power loss directly and negatively affect range, data rate, data fidelity, etc. As shown, retro-optimized lens arrangement 400 is configured to maintain a ratio of on-axis power transmission to off-axis power transmission of greater than 0.8 for field angles up to 60 degrees above and below the optical axis.

Figure 6:
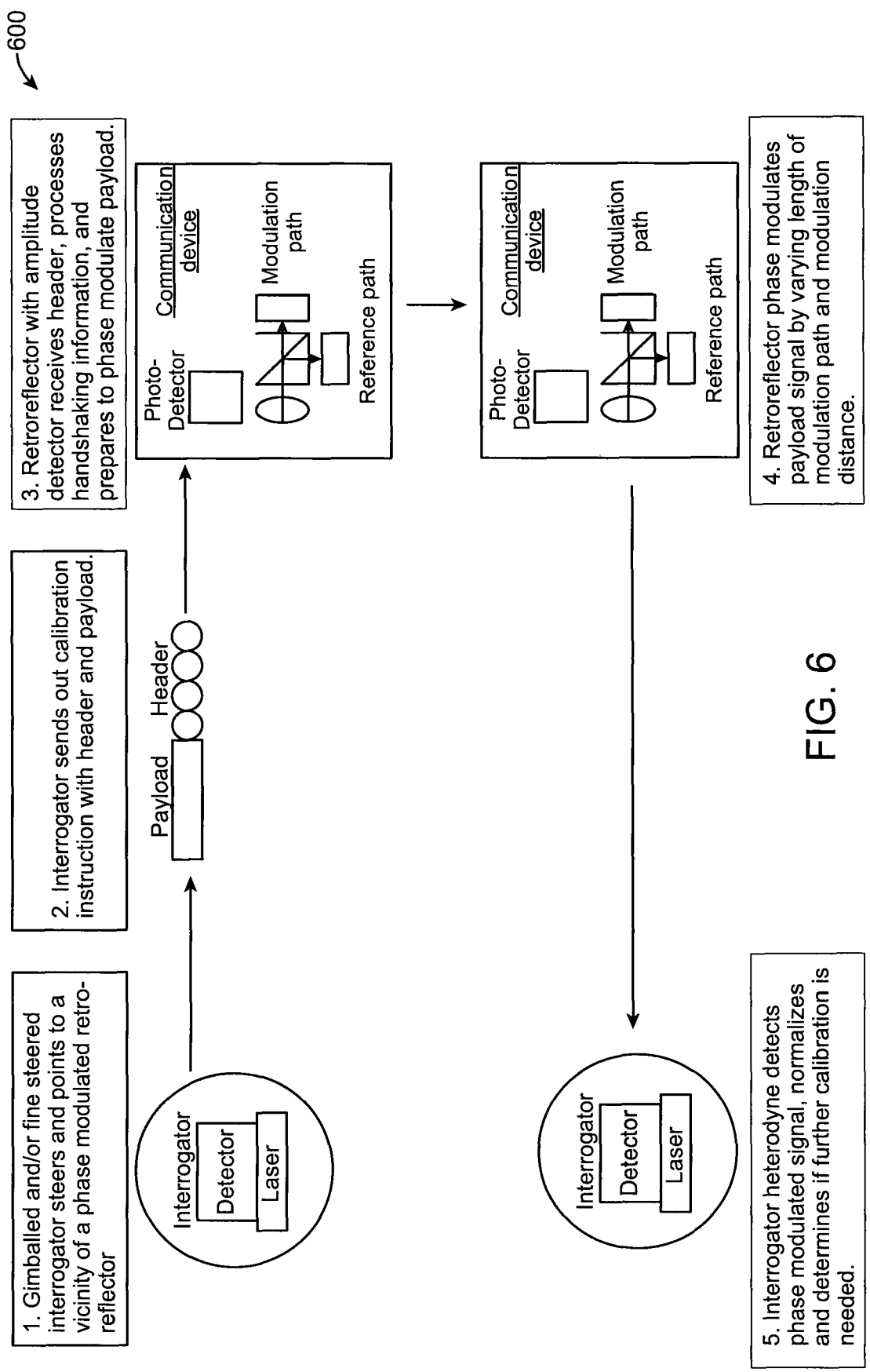
FIG. 6 illustrates a real-time calibration process.

FIG. 6 shows aspects of a dynamic calibration process 600. Dynamic calibration process 600 can be performed by the interrogator 110 and target 150 of communication system 100. As shown, the process begins when the interrogator initiates communication. In some embodiments, the interrogator can have a gimballed or other fine-steering mechanism and can point its optical source in the vicinity of the target. For example, a general location of the target may be known and the interrogator may initiate communications by sweeping the area with the optical communication signal.

As part of its initial communication, the interrogator can send a calibration instruction to the target. The calibration instruction can include a header portion and a payload. The header can include handshaking information to permit the target to synchronize to the optical communication signal and one or more identifiers such as security codes or address information.

The payload of the calibration instruction can include a training sequence or other predetermined pattern for testing the phase modulation capabilities of the target given the relative position of each device, environmental conditions, etc. After the handshaking is complete, the target can acquire the training sequence and can use it to phase modulate the optical communication signal. For example, processor 250 can reproduce the training sequence by varying its modulation path length over a given modulation distance.

The interrogator can detect reference and modulated signals from the target and attempt to recover the training sequence. Depending upon the received signals, the interrogator can issue further calibration instructions or it can signal to the target that calibration is complete. For example, the calibration instruction can include a command for adjusting the bias length of the modulation path. The calibration instruction can also include a command for adjusting the phase of the modulated signal by, for example, varying the modulation distance $\epsilon$ by which actuators 290 change the position of moveable reflector 280.

After each calibration instruction is processed, the target can re-transmit the training sequence by phase-modulating the incoming communication signal. In some embodiments, the target stores the training sequence in memory 255 so that it can be omitted from subsequent calibration instructions. Alternatively, the interrogator can transmit the training sequence with each calibration instruction until the target is fully calibrated. When the training sequence is properly received, the interrogator can signal to the target that calibration is complete and bidirectional data communication between devices can begin.

Figure 7:
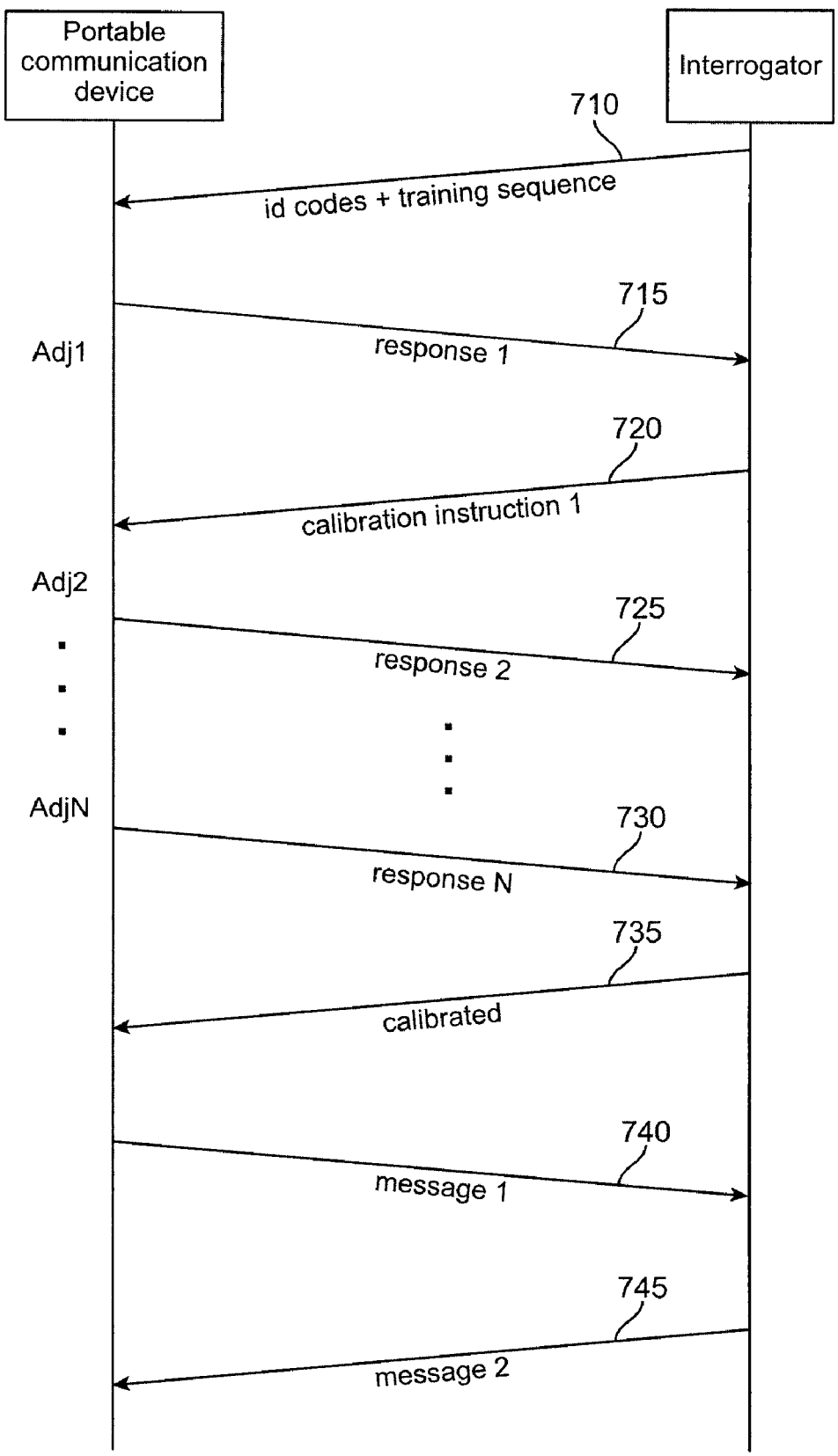
FIG. 7 shows aspects of bidirectional phase-modulated communication.

FIG. 7 shows aspects of communications between an interrogator 110 and a portable communication device such as can be performed in communication system 100. In a first stage 710, the interrogator attempts to initiate communication with the portable communication device by amplitude modulating an infrared laser or other optical source which serves as the optical carrier. The amplitude modulation can be implemented as an on/off keying of the optical source at a data rate of the communication device.

The interrogator can provide one or more identification codes and a training sequence with its initial communication. The identification codes can include information about the interrogator and/or the communication device. For example, the interrogator can transmit an authentication code and an address of the device with which it wishes to communicate. The initial communication can also include a training sequence that is to be phase-modulated by the communication device to ensure its proper calibration. When the interrogator finishes transmitting data, it can continue sourcing the optical communication signal and wait for a response from the portable communication device.

The portable communication device can detect the incoming communication signal from the interrogator and determine whether to respond or remain silent. Before responding, the communication device can decode the identification and training information and compare them with data from its memory. In one embodiment, the communication device determines whether it is the intended target of the message and whether it is authorized to communicate with the sender based on the identification code.

In a next stage 715, the communication device responds to the interrogator by phase-modulating the optical communication signal with the training sequence. Phase modulation can involve creating a fixed or variable phase difference relative to a reference signal. For example, as previously discussed, an initial calibration can be performed to account for manufacturing and environmental variations. After the initial calibration, the reference path and modulation path will differ by an integral number (n) of communication wavelengths (λ) as follows:

$$\text{ModPathLength} = \text{RefPathLength} \pm n \ast \lambda, \text{ where } n=0, 1, 2, \ldots \quad (1)$$

To phase modulate the optical communication signal, the communication device can vary the modulation path length by the modulation distance. In a simple binary case, the modulation distance could be set at an odd multiple of quarter wavelengths (e.g., ModDistance=$(2n+1) \ast (\lambda/4)$, n=0, 1, 2, ...) for creating a 90 degree phase difference between signals. Of course, different phase relationships can be created by adjusting the modulation distance and both analog and digital phase-modulation can be used.

The interrogator can receive the phase-modulated response and attempt to recover the training sequence. If the training sequence cannot be recovered or errors are encountered, stage 720, the interrogator can send a calibration instruction to the communication device. The calibration instruction can specify increasing or decreasing the amount of phase modulation and can direct a change in the amplitude of the modulated signal. For example, in some embodiments, processor 250 decodes the calibration instruction and changes a bias voltage applied to actuators 290 to create a small change in the modulation path length. If the interrogator requests a change in the phase of the modulated signal, processor 250 can vary the modulation distance of moveable reflector 280 to produce a corresponding change in the modulation depth of the communication signal.

When the adjustments indicated in the calibration instruction have been made, stage 725, the communication device again phase modulates the optical communication signal with the training sequence. In an iterative fashion, the interrogator provides calibration instructions and the communication device responds by adjusting its settings and phase modulating the optical communication signal. When the interrogator successfully recovers the training sequence, stage 735, it can indicate to the communication device that calibration is complete. Thereafter, stages 740-745, the devices can exchange phase-coded messages in a bidirectional communication.

Figure 8:
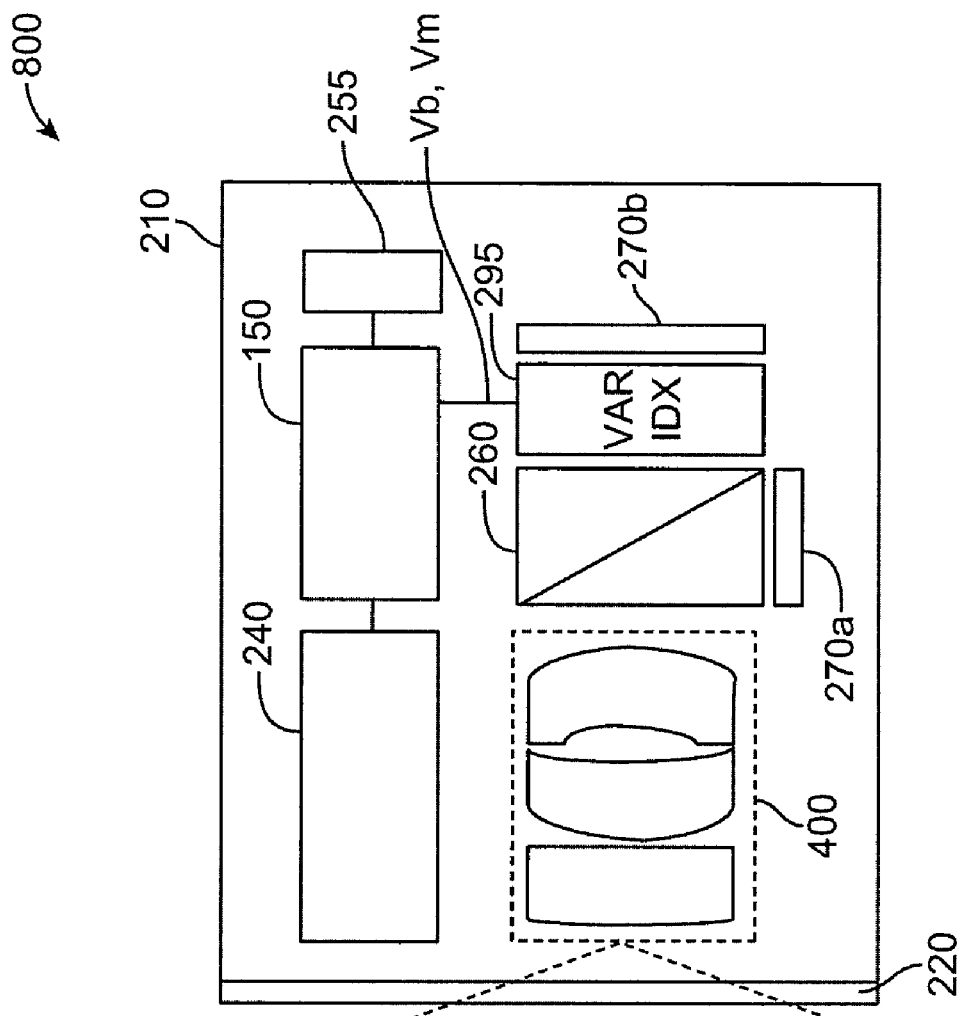
FIG. 8 is a block diagram of a communication device.

FIG. 8 depicts a further embodiment of a phase-modulating communication device 800. Communication device 800 is similar to communication device 200 except that actuators 290 are omitted and moveable reflector 280 is replaced by a second fixed reflector 270b. Also, an electro-optical crystal 295 is disposed between beam splitter 260 and fixed reflector 270b.

The electro-optical crystal 295 has a variable index of refraction which can be changed by signals from processor 250. In this embodiment, processor 250 controls modulation of the incoming communication signal by varying the optical path length of the crystal. Changing the index of refraction produces a corresponding change in the propagation velocity of the communication signal in the crystal medium. As a result, the optical depth of the crystal and the modulation path length change in response to signals from processor 250. In some embodiments, electro-optical crystal 295 can also vary a polarization of the incoming communication signal to provide an additional information carrier.

As an initial calibration, processor 250 can establish a bias voltage level Vb for the electro-optical crystal such that a difference between the reference path and the modulation path length is an integral number of multiples of the communication signal wavelength. The bias voltage Vb can account for differences due to manufacturing tolerance, temperature, and other environmental factors as previously discussed. Processor 250 can then apply a modulation voltage Vm (corresponding to the modulation distance) to change the index of refraction and thereby phase-modulate the incoming communication signal. Both the bias voltage Vb and the modulation voltage Vm can be further adjusted in response to calibration instructions from the interrogator.

Figure 9:
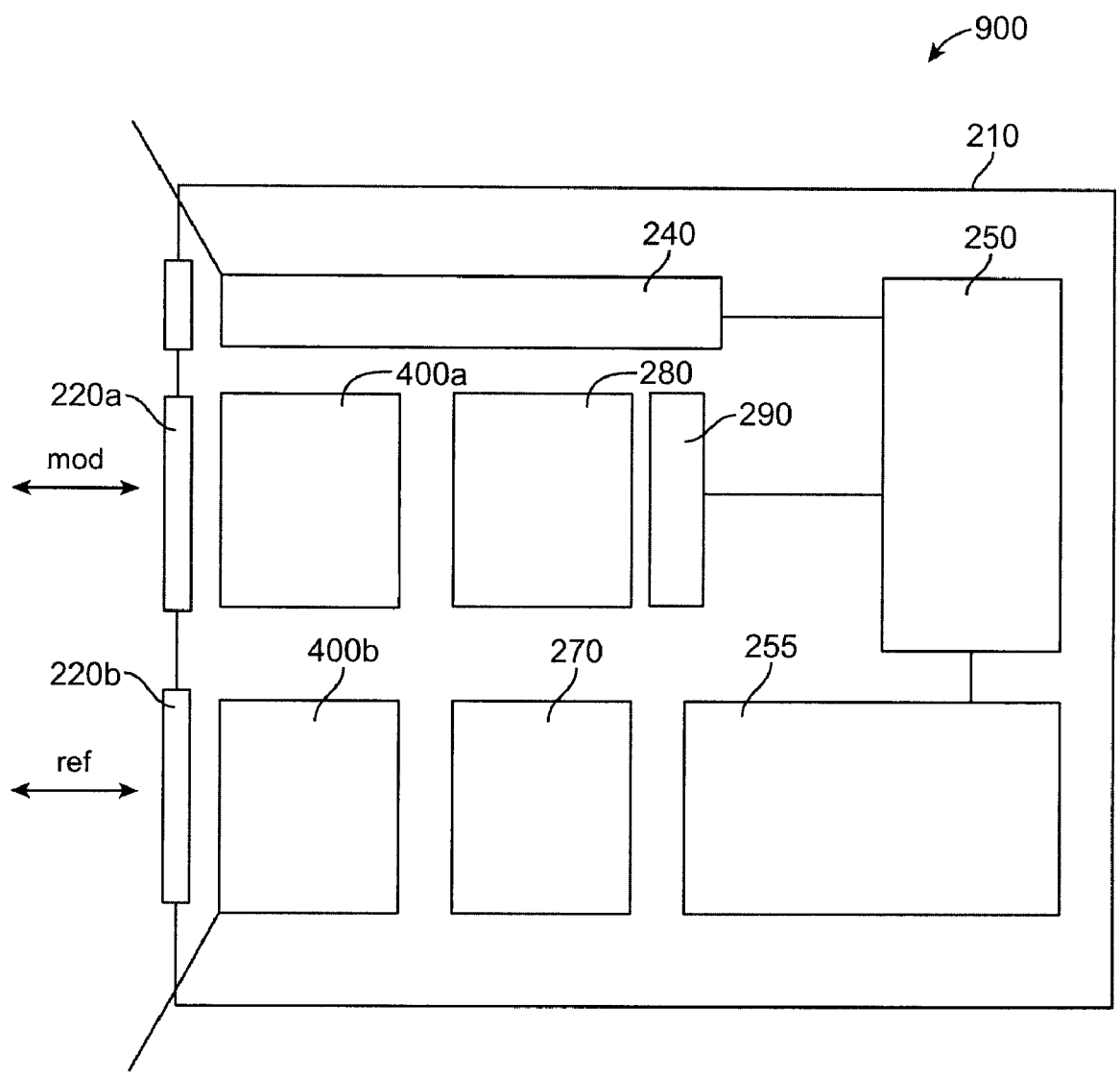
FIG. 9 is a block diagram of another communication device.

FIG. 9 depicts yet another embodiment of a phase-modulating communication device 900. In this embodiment, the reference and modulation paths are substantially parallel to each other within housing 210 and a separate aperture 220 is provided for each. Beam splitter 260 is omitted.

In this embodiment, a first part of the incoming communication signal enters housing 210 through a modulation aperture 220a on the modulation path and is optically coupled to a first retro-optimized lens arrangement 400a. A moveable reflector 280 is coupled to retro-optimized lens 400a for returning the signal back along the modulation path and out of housing 210 through the modulation aperture 220a. Also, a second part of the incoming communication signal enters the housing 210 through a reference aperture 220b on the reference path and is optically coupled to a second retro-optimized lens arrangement 400b. A fixed reflector 270 is coupled to retro-optimized lens 400b for returning the signal back along the reference path and out of housing 210 through the reference aperture 220b.

In operation, processor 250 controls one or more actuators 290 to create a phase difference between the signal on the modulation path and the signal on the reference path such that the phase modulated return signal can be demodulated at the interrogator. As previously discussed, processor 250 can perform an initial calibration by adjusting the bias voltage applied to actuators 290 and can perform a real-time calibration in response to calibration messages from the interrogator.

In a related embodiment, moveable reflector 280 and actuators 290 are replaced by an electro-optical crystal 295. The electro-optical crystal 295 can be controlled by processor 250 to vary its optical path length as described in connection with FIG. 8. The result is a two-aperture communication device in which a variable index of refraction element is used to create a phase-difference between the first part and second part of the incoming communication signal. It will be recognized that further variations are possible within the scope of this disclosure and that therefore the present invention is not limited to a particular device configuration.

Figure 10:
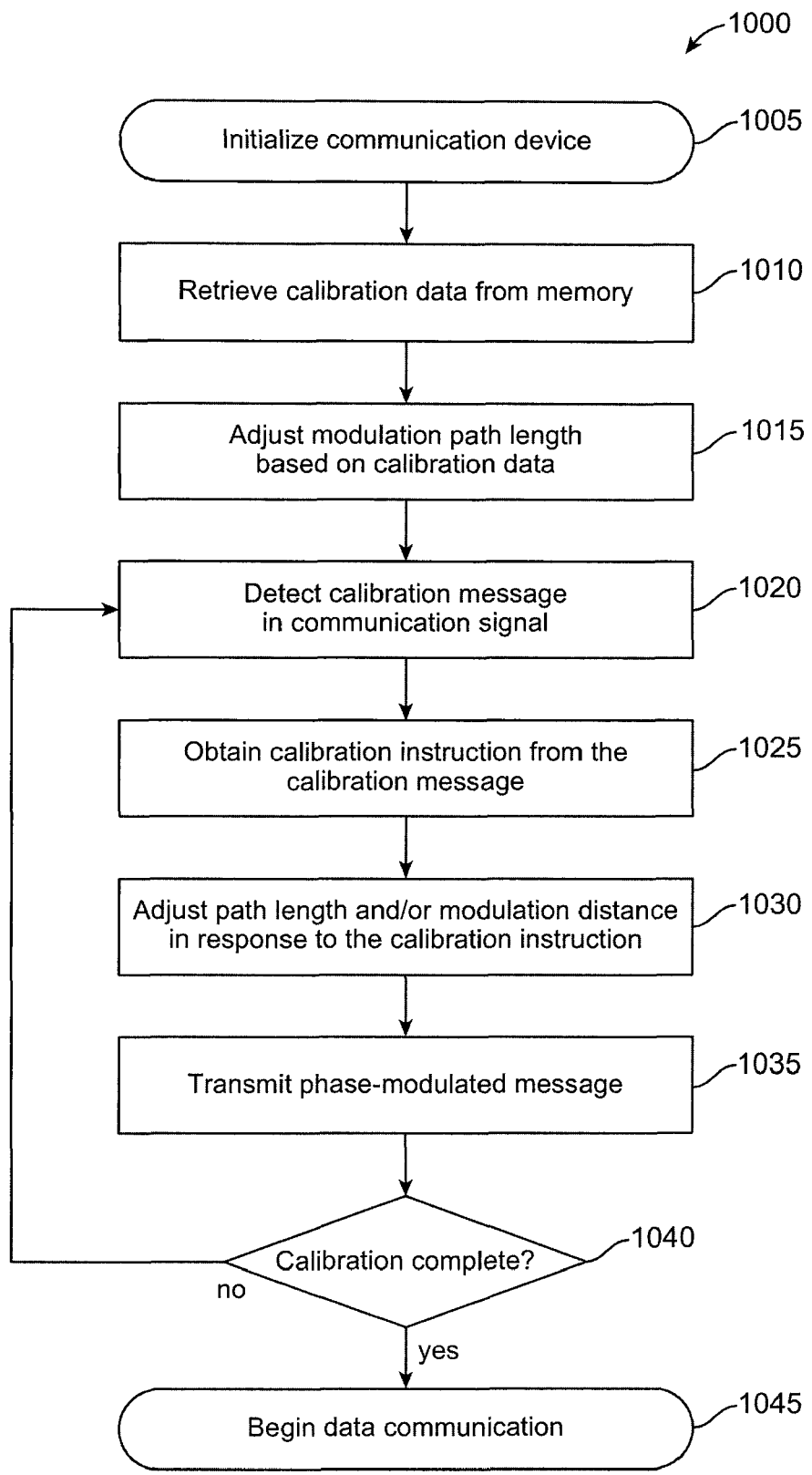
FIG. 10 is a flow chart of an exemplary calibration process.

FIG. 10 depicts a calibration process 1000 such as can be performed by a phase modulating communication device in accordance with embodiments of the present invention. For example, calibration process 1000 can be performed by processor 250 in connection with communication devices 200, 400, 800, and 900.

The calibration process begins at block 1005. This can correspond to activating the communication device or resetting its operation. At block 1010, calibration data is retrieved from memory. The calibration data can include information about manufacturing tolerances and environmental data indexed according to temperature. For example, the processor can determine an ambient temperature of the communication device and retrieve a voltage correction from the environmental data. The voltage correction can be combined with the manufacturing tolerances to arrive at a bias voltage. At block 1015, the processor uses the bias voltage to adjust a length of the modulation path.

At block 1020, the communication device detects an incoming communication signal with a calibration message. This can be accomplished, block 1025, by monitoring the amplitude of the incoming communication signal to obtain training data. The training data can include a calibration instruction and a training sequence. The calibration instruction can specify a phase modulation change to be carried out by the communication device. For example, the instruction can direct the communication device to change the length of the modulation path or the modulation distance.

At block 1030, the processor makes adjustments according to the calibration instruction. Thereafter, at block 1035, the communication device sends a phase-modulated message with the new settings. This can include, for example, phase-modulating the incoming communication signal with the training sequence or other predetermined data. Note that because the reference and modulation paths are separated, δ is a function of both the angle of arrival and the distance to the interrogator. Thus, calibration parameters and path length information may be determined and stored separately for each interrogator location.

At block 1040, the processor determines if calibration is complete. The interrogator can signal that calibration is complete by sending another calibration message indicating that no further adjustments are required. Alternatively, the interrogator can begin sending non-calibration data messages. When calibration is complete, block 1045, the devices can begin sending and receiving data with analog or digital phase modulation. On the other hand, if additional calibration instructions are received, the process can continue from block 1020.

While the principles of the disclosure have been described above in connection with specific apparatuses and methods, it is to be clearly understood that this description is made only by way of example and not as a limitation on the scope of the disclosure. Persons of skill in the art will recognize that the present invention may be embodied in other specific forms and those skilled in the art will understand, or be able to ascertain using no more than routine experimentation, many equivalents to the specific embodiments of the invention described herein. Such equivalents are intended to be encompassed by the following claims.

What is claimed is:

1. A phase-modulating communication device, comprising:
   a housing;
   a lens arrangement configured to pass a communication signal into the housing;
   a beam splitter optically coupled to the lens arrangement and configured to direct a first part of the communication signal along a reference path and a second part of the communication signal along a modulation path;

a phase modulator configured to vary a length of the modulation path in relation to a length of the reference path responsive to a control signal;

a photodetector configured to detect the communication signal and to output a receive data signal;

a processor coupled to the phase modulator and the photodetector and configured to modulate the control signal based on the receive data signal;

a first reflective element configured to reflect the first part of the communication signal along the reference path and toward a source of the communication signal; and a second reflective element configured to reflect the second part of the communication signal along the modulation path and toward the source of the communication signal.

2. The communication device of claim 1, wherein the processor is configured to detect a calibration instruction in the receive data signal and to vary the length of the modulation path according to the calibration instruction.

3. The communication device of claim 2, wherein the processor is configured to vary a modulation distance of the phase modulator in response to the calibration instruction.

4. The communication device of claim 1, wherein the lens arrangement comprises a retro-optimized lens.

5. The communication device of claim 4, wherein the retro-optimized lens is configured to minimize a deviation of at least one of the first part or the second part of the communication signal from a respective incident path.

6. The communication device of claim 4, wherein a field of view of the retro-optimized lens is at least ±50 degrees relative to an optical axis of the retro-optimized lens.

7. The communication device of claim 4, wherein the retro-optimized lens comprises an optical medium having an index of refraction of at least three.

8. The communication device of claim 1, wherein the processor is configured to retrieve calibration data from a memory of the communication device and to establish a base length of the modulation path according to the calibration data.

9. The communication device of claim 1, wherein the phase modulator varies the modulation path length by the modulation distance in response to a transmit data signal from the processor.

10. A method of phase-modulated communication using a device with a reference path and a modulation path, the method comprising:

retrieving calibration data from a memory of the device;

applying a bias signal to one or more actuators of the device according to the calibration data;

adjusting a length of the modulation path in response to the bias signal;

detecting the communication signal at the device;

splitting a first part of the communication signal along the reference path and a second part of the communication signal along the modulation path;

varying the length of the modulation path, based on the detected communication signal, using the one or more actuators to create a phase difference between the second part of the communication signal and the first part of the communication signal; and reflecting the first part of the communication signal and the second part of the communication signal back along their respective reference path and modulation path away from the device.

11. The method of claim 10, further comprising minimizing a deviation of the first part and the second part of the communication signal from an incident path of the communication signal such that the deviation does not exceed a predetermined value over a field of view of the device.

12. The method of claim 10, wherein the calibration data comprises a path length adjustment determined according to a wavelength of the communication signal.

13. The method of claim 12, wherein the path length adjustment is determined such that the modulation path length is approximately an integral number of wavelengths of the communication signal relative to a length of the reference path.

14. The method of claim 10, further comprising detecting a calibration instruction in the received communication signal and varying the length of the modulation path or a modulation distance of the device in response to the calibration instruction.

15. The method of claim 10, further comprising identifying a sender of the communication signal; and varying the length of the modulation path based on the identity of the sender.

16. A communication device, comprising:

a housing having an aperture for receiving a communication signal;

an optical arrangement disposed within the housing comprising:

a beam splitter configured to divide the incoming communication signal into a first signal and a second signal;

at least two reflectors, wherein:

a first reflector is configured to reflect the first signal toward a source of the communication signal, and a second reflector is configured to reflect the second signal toward the source of the communication signal;

a retro-optimized lens optically coupled with the at least two reflectors, the retro-optimized lens configured to minimize a deviation of the reflected first and second signals from an incident path of the communication signal;

a photodetector optically coupled to the communication signal and configured to provide an output; and a phase modulator coupled to the optical arrangement and configured to selectively vary a phase of one of the first or second reflected signals.

17. The communication device of claim 16, further comprising a processor coupled to the phase modulator and wherein the phase modulator varies the phase of the reflected signal in response to a data signal from the processor.

18. The communication device of claim 17, wherein the processor generates the data signal in response to the output of the photodetector.

19. The communication device of claim 17, wherein the phase modulator varies a path length of the second signal in response to the data signal.

20. The communication device of claim 19, further comprising a memory configured to store calibration data relating to the first and second path lengths, and wherein the processor varies the path length of the second signal based on the calibration data.

21. The communication device of claim 20, wherein the calibration data comprises path length information associated with a plurality of transmitter locations.

22. The communication device of claim 20, wherein the phase modulator comprises one or more electro-mechanical actuators.

23. The communication device of claim 22, wherein the calibration data includes a path length adjustment such that the second path comprises an integral number of wavelengths of the communication signal when the path length adjustment is applied.

24. The communication device of claim 23, wherein the calibration data comprises a bias voltage value, and wherein the processor is configured to control delivery of a bias voltage to the one or more actuators in accordance with the bias voltage value.

25. The communication device of claim 16, wherein the phase modulator comprises an actuator coupled to one or more of the at least two reflectors and wherein the actuator changes from a first state to a second state in response to the data signal.

26. The communication device of claim 25, wherein the actuator comprises a plurality of piezo-electric actuators.

27. The communication device of claim 17, wherein the phase modulator comprises an optical element having a variable index of refraction.

28. The communication device of claim 27, wherein the processor is configured to vary the index of refraction of the optical element.

29. The communication device of claim 18, wherein the processor is configured to detect a sender of the communication signal based on the output of the photodetector and to generate the data signal according to an identity of the sender.

30. The communication device of claim 18, wherein the processor detects a calibration instruction based on the output of the photodetector and varies a path length of the second path or a modulation distance of the phase modulator in response to the calibration instruction.

31. The communication device of claim 16, wherein a field of view of the retro-optimized lens is at least ±50 degrees relative to an optical axis of the retro-optimized lens.

32. The communication device of claim 16, wherein the retro-optimized lens comprises an optical medium having an index of refraction of at least three.

33. The communication device of claim 16, wherein the phase modulator performs an analog or digital phase modulation of the reflected signal.

34. A phase-modulating retro-reflector, comprising:
a housing having first and second apertures;
a first lens optically coupled to the first aperture for receiving a first portion of an incoming communication signal;
a first reflector optically coupled to the first lens and configured to reflect the first portion of the incoming communication signal along a reference path and toward a source of the communication signal;
a second lens optically coupled to the second aperture for receiving a second portion of the incoming communication signal;
a second reflector optically coupled to the second lens and configured to reflect the second portion of the incoming communication signal along a modulation path toward the source of the communication signal;
an actuator configured to change a state of the second reflector so as to vary a length of the modulation path;
a detector configured to detect the incoming communication signal and provide an output; and
a processor coupled to the actuator for controlling a length of the modulation path in response to the output of the detector.

* * * * *